F. S. STEARNS AND C. W. GREENE.
TUBE WELDING MACHINE.
APPLICATION FILED JAN. 24, 1917. RENEWED JUNE 8, 1922.

1,434,925.

Patented Nov. 7, 1922.

Inventors.
Frederick S. Stearns
Chester W. Greene
by Heard Smith & Tennant.
Attys.

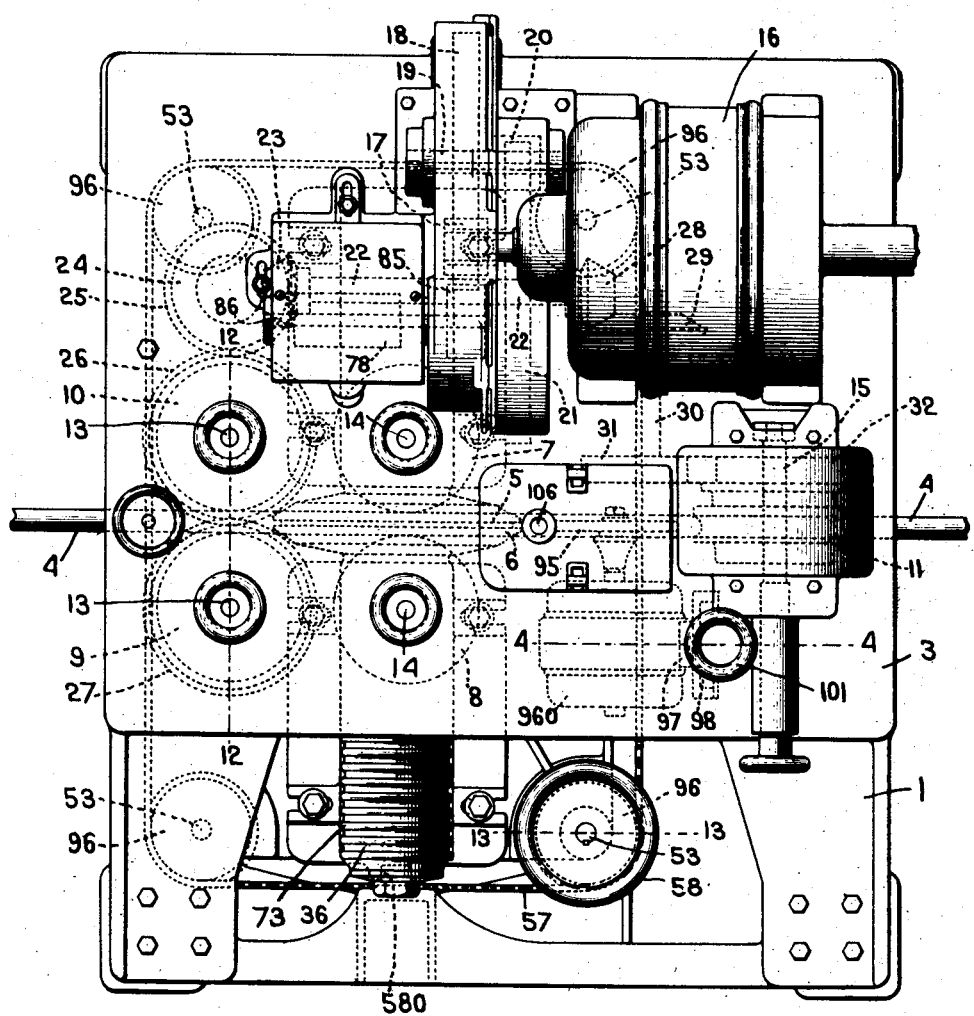

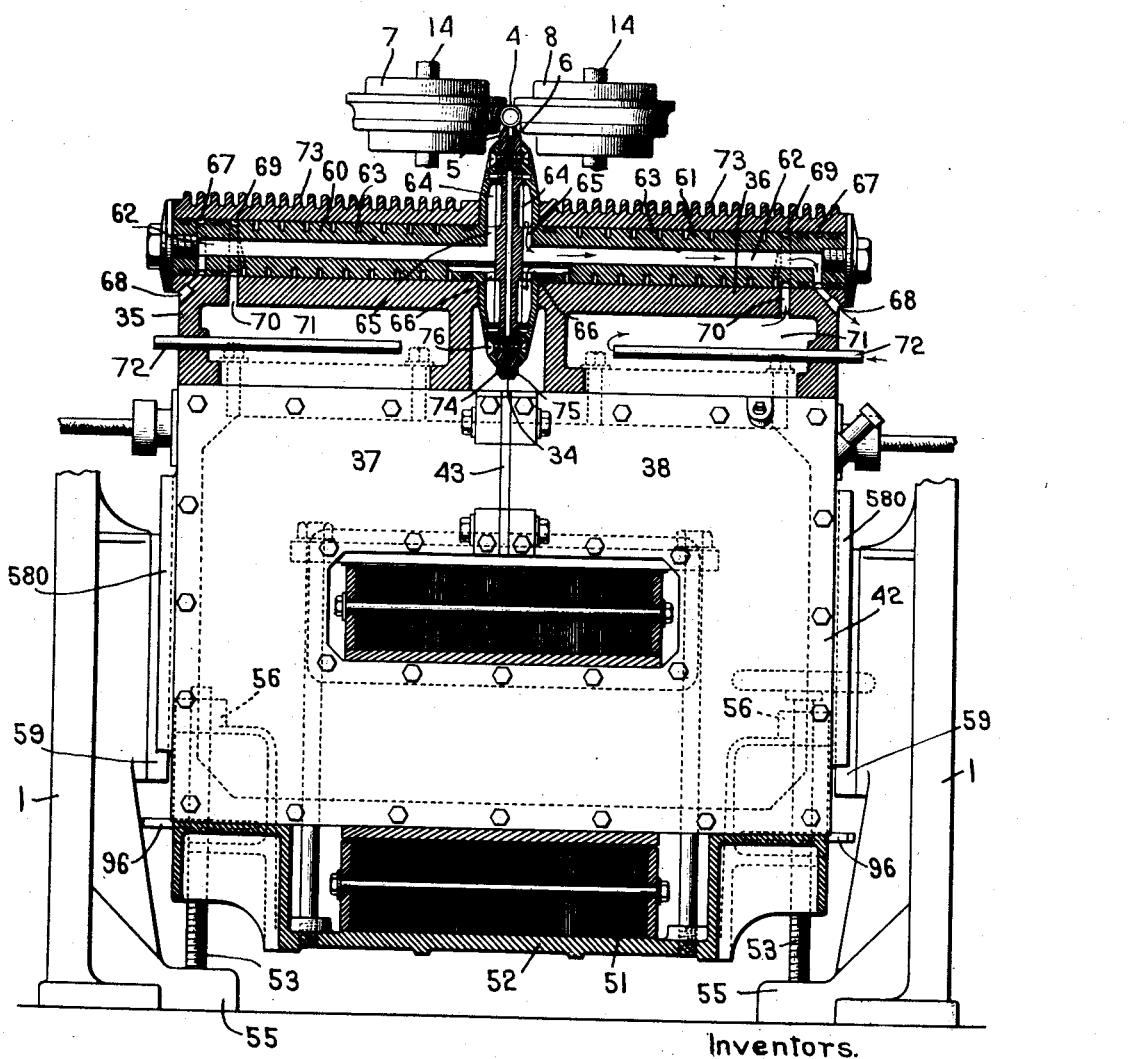

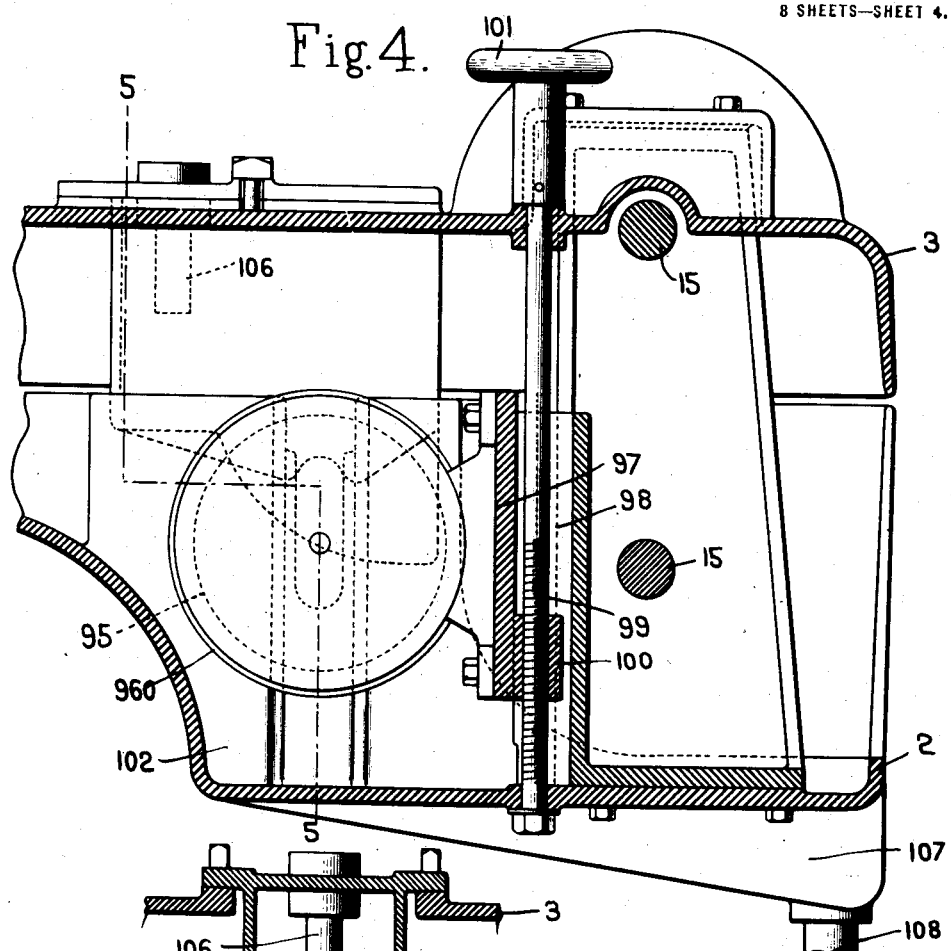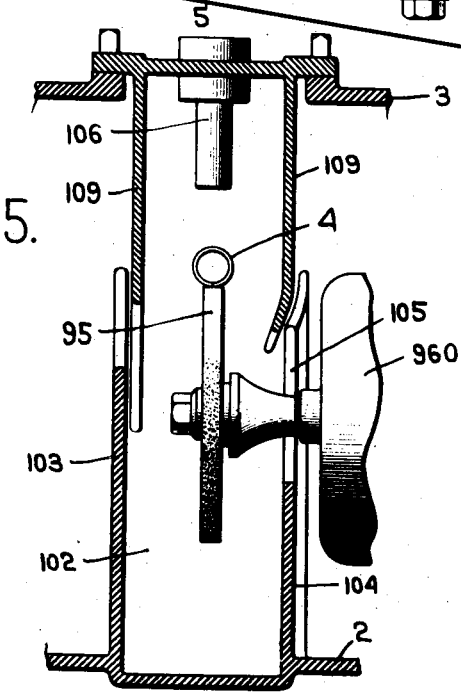

F. S. STEARNS AND C. W. GREENE.
TUBE WELDING MACHINE.
APPLICATION FILED JAN. 24, 1917. RENEWED JUNE 8, 1922.

1,434,925.

Patented Nov. 7, 1922.
8 SHEETS—SHEET 5.

Inventors.
Frederick S. Stearns
Chester W. Greene
by Heard Smith & Tennant.
Attys.

F. S. STEARNS AND C. W. GREENE.
TUBE WELDING MACHINE.
APPLICATION FILED JAN. 24, 1917. RENEWED JUNE 8, 1922.

1,434,925.

Patented Nov. 7, 1922.
8 SHEETS—SHEET 6.

Inventors.
Frederick S. Stearns
Chester W. Greene
by Heard Smith & Tennant.
Attys.

F. S. STEARNS AND C. W. GREENE.
TUBE WELDING MACHINE.
APPLICATION FILED JAN. 24, 1917. RENEWED JUNE 8, 1922.

1,434,925.

Patented Nov. 7, 1922.
8 SHEETS—SHEET 7.

Inventors.
Frederick S. Stearns.
Chester W. Greene
by Heard Smith & Tennant
Attys.

F. S. STEARNS AND C. W. GREENE.
TUBE WELDING MACHINE.
APPLICATION FILED JAN. 24, 1917. RENEWED JUNE 8, 1922.

1,434,925.

Patented Nov. 7, 1922.
8 SHEETS—SHEET 8.

Inventors
Frederick S. Stearns
Chester W. Greene
by Heard Smith & Tennant
Attys.

Patented Nov. 7, 1922.

1,434,925

UNITED STATES PATENT OFFICE.

FREDERICK S. STEARNS AND CHESTER W. GREENE, OF LYNN, MASSACHUSETTS, ASSIGNORS TO FRANCIS G. GALE, OF WATERVILLE, CANADA.

TUBE-WELDING MACHINE.

Application filed January 24, 1917, Serial No. 144,268. Renewed June 8, 1922. Serial No. 566,897.

*To all whom it may concern:*

Be it known that we, FREDERICK S. STEARNS and CHESTER W. GREENE, citizens of the United States, and residents of Lynn, county of Essex, State of Massachusetts, have invented an Improvement in Tube-Welding Machines, of which the following description, in connection with the accompanying drawing, is a specification, like characters on the drawing representing like parts.

This invention relates to tube-welding machines of that type which include a pair of contact rolls over which the shaped tube is passed with the seam in the tube situated between the contact rolls so that the welding current will pass from one roll to the other across the seam, a pair of squeeze rolls acting on the tube as it passes over the contact rolls and which operate to force together the edges of the seam thereby making the weld, a pair of preliminary shaping rolls which act on the tube in front of the contact rolls, and a pair of final shaping rolls which act on the tube after it has passed through the welding rolls and which give it its final shape.

The objects of the invention are to improve welding machines of this type by providing improved contact rolls having novel means for supporting and cooling them by providing novel means for guiding the tube as it passes through the preliminary shaping rolls, which guiding means ensures that the edges of the tube will be brought into correct alinement before the tube passes to the contact rolls; by providing novel means for regulating the current so as to produce an even uniform weld; by providing novel means for smoothing up the burr formed by the weld; and otherwise to improve tube-welding machines, all as will be more fully hereinafter set forth.

In order to give an understanding of our invention, we have illustrated in the drawings a selected embodiment thereof which will now be described, after which the novel features will be pointed out in the appended claims.

Fig. 2 is a top plan view thereof;

Fig. 3 is a fragmentary sectional view on the line 3—3, Fig. 1;

Fig. 4 is an enlarged sectional view on substantially the line 4—4, Fig. 2;

Fig. 5 is a sectional view on the line 5—5, Fig. 4;

Figure 1:
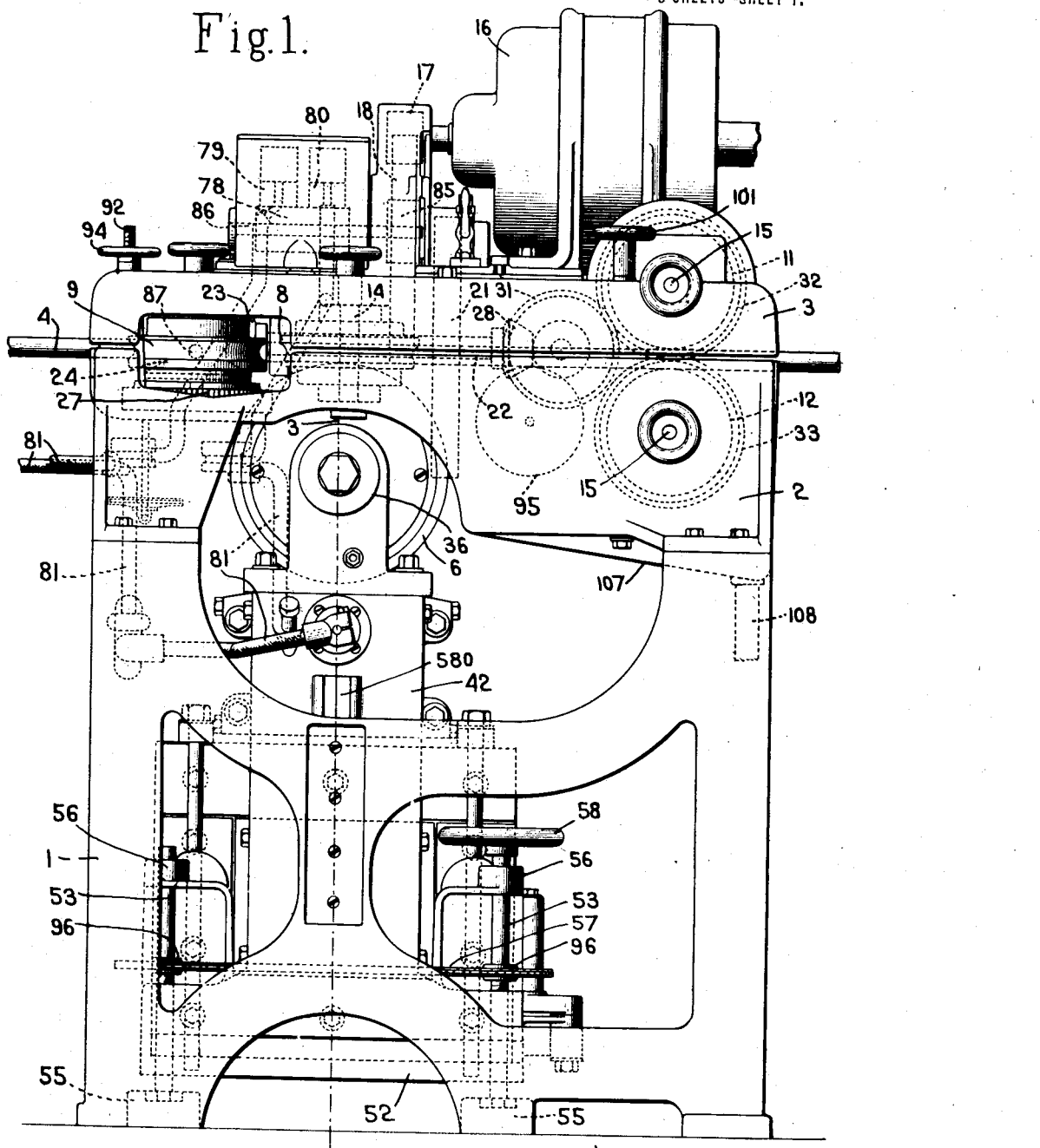
Fig. 1 is a side view of a welding machine embodying our invention.
Figure 6:
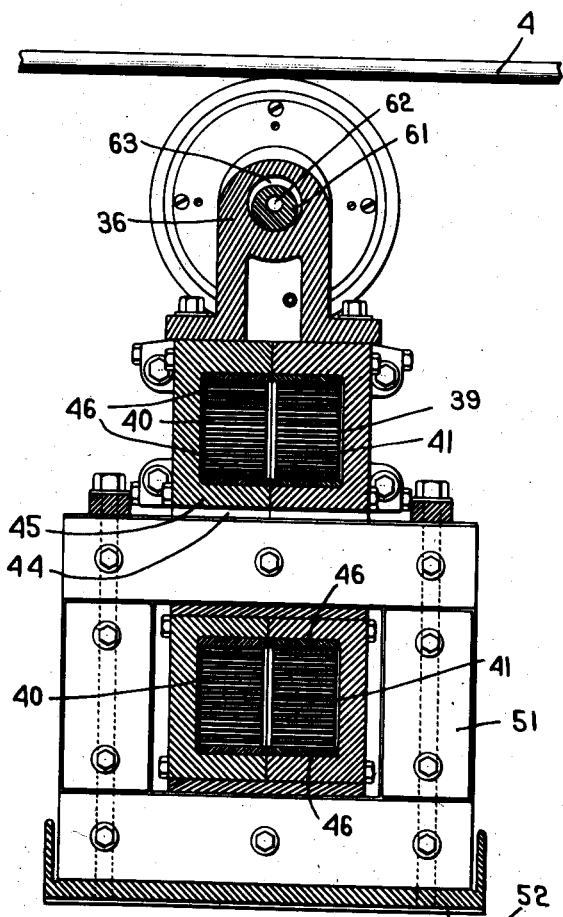
Fig. 6 is a vertical sectional view through the transformer.

The operative parts of the machine are mounted upon a frame which is herein illustrated as comprising the base portion 1 and the top or head portion presenting the two members 2 and 3. The head is sustained on the base 1 in any suitable way. The transformer and the contact rolls are mounted on the base 1. The preliminary and final shaping rolls and the squeeze rolls are shown as mounted on the head portion, said rolls being illustrated as situated between the two sections 2 and 3. The tube which is being welded is indicated at 4, it being understood that said tube is formed into tubular shape from a strip with the edges of the strip abutting each other, thus forming a joint which extends longitudinally of the tube, and that the tube is completed by welding together the abutting edges, this being a well known way of making tubing. The contact rolls are shown at 5 and 6 and they are insulated from each other. The manner in which these contact rolls are made and supported will be presently described. The squeeze rolls which force together the abutting edges of the tube as they are heated by passing over the contact rolls thereby to make the weld, are indicated at 7 and 8, respectively.

The preliminary forming rolls through which the tube passes before it reaches the contact rolls are indicated at 9 and 10, respectively, and the final forming rolls which act on the tube after the weld has been made and which trues it up and gives it its final shape are indicated at 11 and 12, respectively As stated above, the squeeze rolls and preliminary and final forming rolls are situated between the two sections 2 and 3 of the head. The preliminary forming rolls 9 and 10 are rotatably mounted upon vertically-extending stationary shafts 13 which are secured in the two sections 2 and 3 of the head, the squeeze rolls 6 and 7 are rotatably mounted on two other vertically-extending stationary shafts 14 also secured in the two sections 2 and 3 of the head, and the final shaping rolls 11 and 12 are rotatably mounted upon two horizontally-extending stationary shafts 15, one of which is mounted in the upper section 3 of the head and the other of which is mounted in the lower section 2 of the head.

Figure 11:
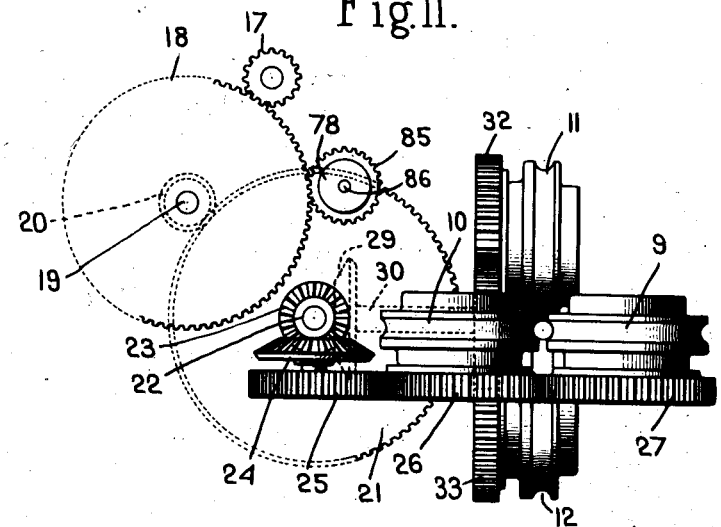
Fig. 11 is a detail view showing the driving gearing for the preliminary and final shaping rolls.
Figure 12:
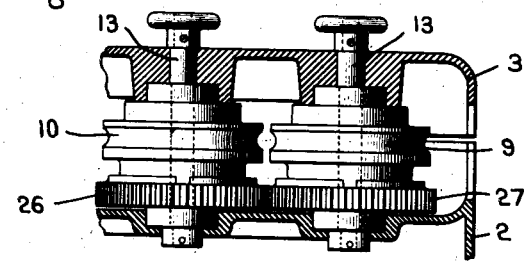
Fig. 12 is a sectional view on the line 12—12, Fig. 2.
Figure 13:
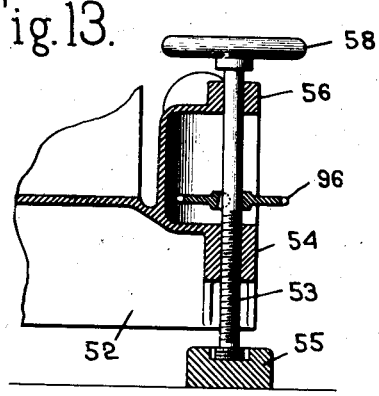
Fig. 13 is a sectional view on the line 13—13, Fig. 2.
Figure 14:
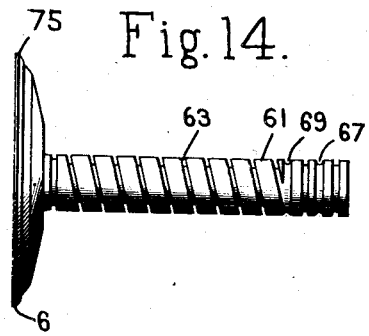
Fig. 14 is a view in elevation showing one of the contact rolls provided with an elongated hub.
Figure 15:
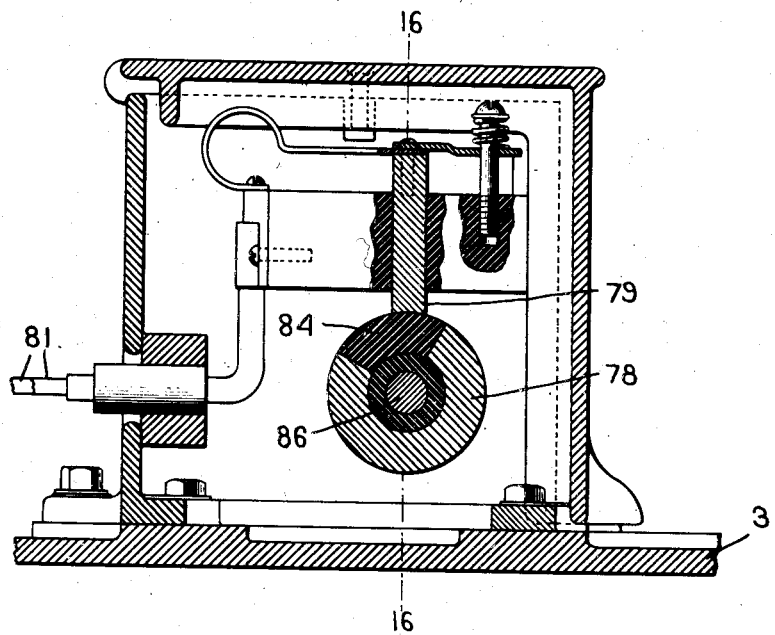
Fig. 15 is an enlarged sectional view on the line 15—15, Fig. 16 of the make-and-break device.
Figure 16:
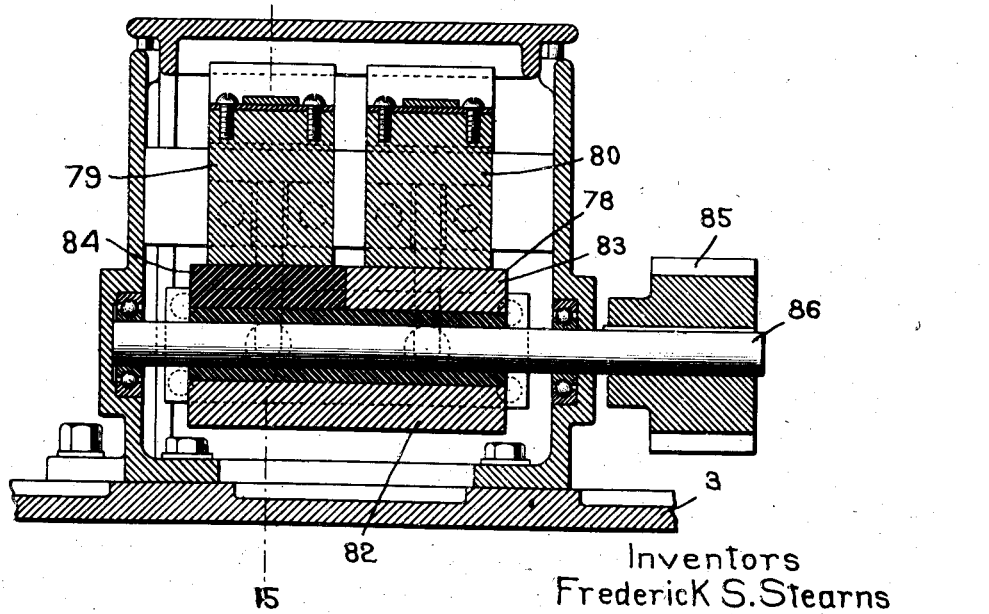
Fig. 16 is a sectional view on the line 16—16, Fig. 15.

The preliminary and final shaping rolls are positively driven and act not only as shaping or forming rolls, but also act as feed rolls. These rolls may be driven in any suitable way. We have herein shown a construction wherein these rolls are all driven from a suitable motor 16 mounted on the top section 3 of the head. The gearing connecting the motor with the rolls is best seen in Figs. 1, 2 and 11. This motor is shown as having a pinion 17 on its shaft which pinion meshes with a gear 18 fast on a shaft 19. The shaft 19 has a pinion 20 thereon which meshes with and drives a gear 21 fast on a shaft 22. The shaft 22 has a bevel gear 23 thereon meshing with a bevel gear 24 which is rigid with a gear 25 that meshes with and drives a gear 26 rigid with the preliminary forming roll 10. The co-operating preliminary forming roll 9 has a gear 27 rigid therewith which meshes with and is driven by the gear 26. The two rolls are thus positively driven in unison. The shaft 22 has at its rear end a bevel gear 28 which meshes with and drives a bevel gear 29 upon a transversely-extending shaft 30, and this shaft 30 has a gear 31 thereon which meshes with and drives a gear 32 rigid with the final forming roll 11. The lower forming roll 12 has a gear 33 rigid therewith which meshes with the gear 32. The two pairs of forming rolls are thus positively driven in unison.

Figure 7:
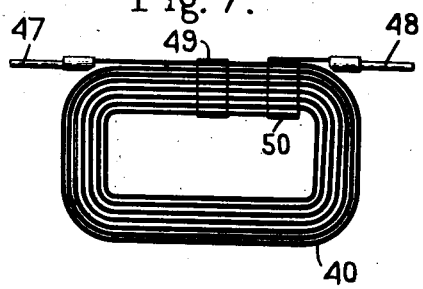
Fig. 7 is a side view of the primary winding of the transformer.
Figure 8:
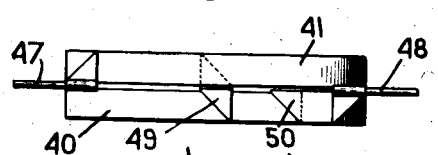
Fig. 8 is a top plan view of Fig. 7.

In welding machines of this type it is customary to connect the two contact rolls to the secondary circuit of a welding transformer so that the current developed by the transformer will pass from one roll to the other through the joint of the tube to be welded. The two contact rolls 5 and 6 are insulated from each other, as at 34, and they are mounted in bearings 35 and 36 which are secured to the poles 37 and 38 of the secondary 42 of the transformer, the poles being insulated from each other, as shown at 43. The transformer may have any suitable or usual construction. The secondary 42 is shown as formed in two sections secured together and as provided with the central opening 44 and chamber 39 extending around said opening in which the primary of the transformer is located. This primary is in the form of two coils 40 and 41 which are connected in series, the coils being wound about the central portion 45 of the secondary and being insulated therefrom by suitable insulation 46. The primary winding is shown in detail in Figs. 7 and 8. The terminal 47 connects to the outer end of the coil 41, and the inner end of the coil 41 is connected to the outer end of the coil 40 by the connection 49, and the other terminal 48 is connected to the inner end of the coil 40 by the connection 50. Associated with the secondary is the laminated core 51 of usual construction, said core passing through the opening 44 in the secondary and embracing the lower portion of the secondary. This secondary thus made is sustained on a platform or support 52 which in turn is mounted on the base portion 1 of the frame. Means are provided for raising and lowering the supporting platform 52 thereby to adjust vertically the contact rolls 5 and 6. The exact vertical position of these rolls depends upon the size of the tube which is being welded. For welding larger tubes, it is necessary to lower the contact rolls, while when smaller tubes are being welded, it is necessary to raise the contact rolls.

We have provided herein a novel means for vertically adjusting the transformer with the contact rolls thereon. This is accomplished by means of four adjusting screws 53 situated at the four corners of the platform 51. Each adjusting screw has screw-threaded engagement with a portion 54 of the platform and finds a bearing at its lower end in a foot 55 on the frame 1. The upper end of the screw extends through a guiding bearing 56 carried by the platform. The turning of any adjusting screw 53 will raise or lower the corner of the supporting platform with which said screw has engagement. We have provided herein means connecting all of the adjusting screws 53 so that they can be operated in unison. The advantage of this is that wherever any adjustment is made, all four screws will be adjusted simultaneously, and the transformer will, therefore, always be maintained at proper level. Each adjusting screw 53 has a sprocket wheel 96 rigid therewith and a chain 57 encircles all of the sprocket wheels.

One of the screws has a hand-wheel 58 thereon by which it may be turned. The turning of the hand-wheel 58 will operate through the sprocket chain 57 to turn all the adjusting screws in unison and thus the proper horizontal position of the transformer and contact rolls will always be maintained.

The transformer is shown as provided with guideways 580 thereon which embrace guides 59 formed on the base 1, these guides and guideways serving to assist in keeping the transformer in proper alinement.

The welding operation develops considerable heat and it is desirable to provide some means for cooling the contact rolls to prevent them from becoming unduly heated or burned. We have provided herein a novel arrangement for this purpose by which a current of water or other cooling medium may be circulated through the contact rolls. The contact rolls 5 and 6 are shown as provided with elongated hubs 60 and 61 which are journaled in the bearings 35 and 36, respectively. These hubs are provided with the axial bores 62 and each is also provided on its exterior with the spiral grooves 63. Each roll is also made with a water chamber 64 which communicates with the axial duct 62 through a port 65 and also with the spiral groove 63 through a port 66. The axial duct 62 communicates with an annular groove 67 formed in the hub, and this groove communicates with an outlet or discharge port 68. The spiral groove 63 communicates at its outer end with an annular groove 69 formed in the hub which in turn communicates through a duct 70 formed in the bearing with a chamber 71. Water is supplied to the chamber 71 through an inlet pipe 72 and there will thus be a circulation of water through each bearing and through each contact roll. This operates not only to keep the contact roll from becoming unduly heated, but also keeps the bearing cool and obviates the necessity of any lubrication. The bearings 35 and 36 are preferably provided with heat-radiating ribs 73 to assist in dissipating the heat.

The contact rolls 5 and 6 will preferably be provided with removable contact rings 74 and 75 so that rings having different shapes at their periphery may be used, depending on the shape and size of the tube to be welded. These rings are shown as removably secured to the contact rolls by means of screws 76.

In order to make a satisfactory weld along the joint of a tube, it is important that the proper temperature should be developed at the welding point at all times. In electrical welding the temperature which is developed depends to some extent upon the resistance at the welding point, and in the practical operation of welding a tube, it frequently happens that the resistance at the welding point varies at different places along the tube. At some places the abutting edges to be welded may be in closer engagement than at other places, and this will cause a difference in resistance. Again, some oil or foreign matter may have accumulated between the abutting edges and the presence of such foreign matter causes variation in the resistance. If a constant steady welding current is used and the resistance varies at different points along the tube, the result will be non-uniformity in the welding operation, for in some places a sufficient temperature will be developed to burn the tube, while at other places an insufficient temperature would be developed to make a proper weld. We have provided herein a novel means for regulating the current automatically so as to produce a uniform weld even though the resistance may vary at different points along the tube. We accomplish this by employing a make-and-break device in the primary circuit of the transformer which is operative to make and break the primary circuit with great rapidity. This operation of thus rapidly making and breaking the primary circuit prevents the secondary current from building up to such an extent as to unduly heat the tube in case the tube at some point presents a decreased resistance. The make-and-break device comprises a rotary contact element 78 with which two resiliently-sustained contacts 79 and 80 have engagement. These two contacts 79, 80 are connected in the primary circuit 81. The portion 82 of the contact 78 with which the contact 79 engages is uninterrupted, while the portion 83 with which the contact 80 engages is interrupted, it being provided with the insulated section 84. The contact 78 is rotated rapidly by some suitable means and we have herein shown for this purpose a gear 85 fast on the shaft 86 of the contact element 78, which gear meshes with and is driven by the gear 18. As the contact element 78 rotates the primary circuit will be opened whenever the insulated section 84 comes under the contact 79 and will be closed again when said contact 79 passes off from the insulated section. This rapid opening and then closing of the circuit prevents undue current from being developed in the secondary in case the resistance fluctuates, and by means of this construction an even welding operation is performed throughout the length of the tube without any necessity of manual manipulation of rheostats or other devices for controlling the current.

Figure 9:
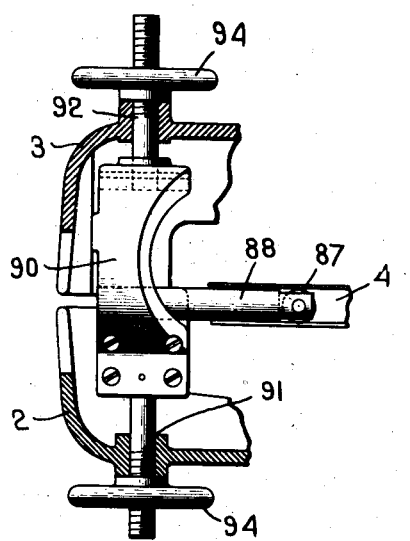
Fig. 9 is a fragmentary sectional view showing the guide for the tube.
Figure 10:
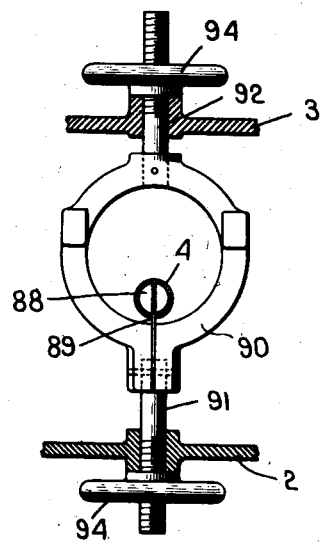
Fig. 10 is an end view of Fig. 9.

In order to secure a proper weld, it is necessary that two edges of the tube should be held in proper alinement as they pass to the welding roll. To assist in thus holding them in alinement, we have provided a guide device which is situated within the tube at the point where it is acted upon by the preliminary forming rolls 9 and 10. This guide is in the form of a roll 87 which is journaled on the end of an arm 88 that is carried by a thin blade or fin 89 extending from a supporting yoke 90. The tube to be welded passes through the yoke 90 and over the arm 88, the fin 89 extending up through the joint in the tube. The roll 87 is situated within the tube at the point where the shaping rolls 9 and 10 act thereon, and this roll 87 bears against the seam of the tube, as shown in Fig. 9 and thus holds the edges of the tube in proper alinement while they are pressed together by the rolls 9 and 10. The yoke 90 is provided with screw-threaded stems 91, 92 which extend through the upper and lower sections of the head and which have nuts 94 thereon. This provides a construction by which the yoke can be vertically adjusted so as to bring the guide roll 87 at the proper elevation.

In welding the longitudinal joint of a tube, a burr or rib is produced where the weld is made. We have provided herein novel means for trimming off this burr before the welded tube is passed through the final shaping rolls. We accomplish this by means of a grinding or abrading tool 95 which has a disk shape and which is situated to grind the under side of the tube as the tube passes thereover. An ordinary emery wheel will answer for this purpose and we have shown this construction herein. This emery wheel is mounted on the shaft of a motor 960 and the motor is sustained in the frame for vertical adjustment so that the emery wheel can be adjusted for different sizes of tubes. As herein shown, the motor is mounted on a carriage or slide 97 which is vertically movable in ways 98 formed on the lower section 2 of the head. The carriage is adjusted vertically by means of an adjusting screw 99 which finds its bearing in the two sections 2 and 3 of the head and which has screw-threaded engagement with the foot portion 100 of the carriage 97. This adjusting screw is provided with a hand-wheel 101 by which it may be operated. The emery wheel 95 is adjusted so as to contact with the under side of the tube, and as the welded tube passes over said wheel, the wheel will trim off the burr so that when the welded tube passes through the final forming rolls 11 and 12, said tube will be properly shaped and will emerge from said rolls with a smooth exterior.

We have provided herein means for feeding water to the emery wheel so as to prevent the tube from becoming unduly heated by the grinding operation. The lower section 2 of the head is shaped to present a well 102 in which the emery wheel operates. This well is provided with the two side walls 103, 104, the side wall 104 being slotted, as at 105, to receive the armature of the motor 960. 106 indicates a nipple leading into the top of the well through the upper section 3 of the casing. We propose to so arrange a supply pipe connected to a source of water supply that said supply pipe will deliver water through the nipple 106 in a small stream or in drops as required to cool the tube 4 and keep it cool. This nipple is arranged directly over the tube so that the water which is delivered through the nipple will drop onto the tube. The well is provided with a drain channel 107 which leads to a discharge pipe 108. The upper section 3 of the head is provided with depending flanges 109 that extend into the well 102, said flanges operating to prevent the water from spattering onto the adjacent mechanism.

We claim:

1. In a tube-welding machine, the combination with a pair of rolls shaped to fit a formed tube and between which said formed tube passes, of a pair of contact rolls situated to act on said tube in the rear of said first-named rolls and means to give said formed tube local support interiorly at the point where it is acted on by said first-named rolls, said means being constructed to provide said support progressively from one end of the tube to the other as the tube is passed through said machine.

2. In a tube-welding machine, the combination with a pair of contact rolls, of a pair of shaping rolls situated to act on the tube to be welded in advance of the contact rolls, a guiding roll situated on the interior of the tube and co-operating with the shaping rolls for giving the tube a proper shape before it engages the contact rolls, and means for supporting the guiding roll, which means permits the tube to be passed completely through said shaping rolls in one direction.

3. In a tube-welding machine, the combination with a pair of contact rolls, of a pair of shaping rolls situated to act on the tube in advance of the contact rolls, a guiding roll co-operating with the shaping rolls, and means to support the guiding roll within the tube, which means permits the tube to be passed from one end to the other thereof through said shaping rolls in one direction.

4. In a tube-welding machine, the combination with a pair of contact rolls, of a pair of shaping rolls situated to act on the tube in advance of the contact rolls, a fin adapted to enter the joint in the tube in advance of the shaping rolls, and a guiding roll supported by said fin and situated on the interior of the tube.

5. In a tube-welding machine, the combination with a pair of contact rolls, of a pair of shaping rolls situated to act on the tube in advance of the contact rolls, a fin adapted to enter the joint in the tube in advance of the shaping rolls, an arm extending rearwardly from said fin, and a guiding roll sustained by said arm.

6. In a tube-welding machine, the combination with a transformer, of contact rolls supported thereon, means to feed a tube to be welded over the contact rolls, and means for adjusting the transformer with the contact rolls thereon relative to the tube-feeding means.

7. In a tube-welding machine, the combination with a transformer, of a pair of contact rolls supported thereon, means to feed a tube to be welded over the contact rolls, a plurality of adjusting screws for adjusting the position of the transformer relative to the feeding means, and means to operate said screws simultaneously.

8. In a tube-welding machine, the combination with a frame, of a platform adjustably sustained thereby, a transformer mounted on said platform, a pair of contact rolls carried by the transformer and electrically connected therewith, means to feed a tube to be welded over the contact rolls, and means to adjust the platform vertically.

9. In a tube-welding machine, the combination with a frame, of a platform adjustably sustained thereby, a transformer mounted on said platform, a pair of contact rolls carried by the transformer and electrically connected therewith, means to feed a tube to be welded over the contact rolls, a plurality of adjusting screws on which the platform is sustained, and means to operate said screws simultaneously.

10. In a tube-welding machine, the combination with a frame, of a platform adjustably sustained thereby, a transformer mounted on said platform, a pair of contact rolls carried by the transformer and electrically connected therewith, means to feed a tube to be welded over the contact rolls, a plurality of adjusting screws on which the platform is sustained, a sprocket wheel carried by each adjusting screw, and a sprocket chain engaging all the sprocket wheels whereby said adjusting screws may be operated in unison.

11. In a tube-welding machine, the combination with a pair of contact rolls, each having a chamber through which a cooling medium may be circulated and also having a journal provided with a spiral circulating passage, of bearings in which said journals are rotatably mounted, and means to feed a tube to be welded over said rolls.

12. In a tube-welding machine, the combination with a pair of contact rolls, each having a chamber through which a cooling medium may be circulated and also having a journal provided with circulating passages or ducts communicating with said chamber, of bearings in which said journals are rotatably mounted, and means to feed a tube to be welded across said rolls.

13. In a tube-welding machine, the combination with a pair of contact rolls, each having a chamber through which a cooling medium may be circulated and a laterally-extending hub or journal provided with an axial bore, and a spiral groove, of bearings in which said hubs are journaled, said bearings being provided with circulating ducts communicating with the axial bore and spiral groove whereby a cooling medium may be circulated through the chambers of said rolls, and means to feed a tube to be welded across the rolls.

14. In a tube-welding machine, the combination with a frame, of tube-feeding means sustained thereby, contact rolls also carried by the frame and adapted to form a weld in the tube as it is fed thereover, said frame being shaped to present a well in the rear of the contact roll, and an abrading tool in said well and adapted to grind off any burr formed on the tube in the welding operation.

15. In a tube-welding machine, the combination with a frame, of tube-feeding means sustained thereby, contact rolls also carried by the frame and adapted to form a weld in the tube as it is fed thereover, said frame being shaped to present a well in the rear of the contact roll, and a rotary grinding wheel in the well and adapted to grind off any burr formed on the tube in the welding operation.

16. In a tube-welding machine, the combination with a frame, of tube-feeding means sustained thereby, contact rolls also carried by the frame and adapted to form a weld in the tube as it is fed thereover, said frame being shaped to present a well in the rear of the contact roll, a rotary grinding wheel in the well and adapted to grind off any burr formed on the tube in the welding operation, and means to adjust the grinding wheel vertically.

17. In a tube-welding machine, the combination with a welding transformer, of two contact rolls connected in the secondary circuit thereof, means to feed a tube to be welded over the contact rolls, and means for making and breaking the primary circuit of the transformer in rapid succession.

18. In a tube-welding machine, the combination with a welding transformer, of two contact rolls connected in the secondary circuit thereof, means to feed a tube to be welded over the contact roll, and means for breaking and making again the primary circuit of the transformer in rapid succession but with a less time interval between each breaking and making of the circuit than between each making and breaking thereof.

19. In a tube-welding machine, the combination with a pair of contact rolls, each having a chamber through which a cooling medium may be circulated, and also having a journal provided with a circulating passage of bearings in which said journals are rotatably mounted and which are provided with circulating passages communicating with those of the journals, and means to feed a tube to be welded over said rolls.

20. In a tube-welding machine, the combination with a pair of contact rolls each having a chamber through which a cooling medium may be circulated, and also having a journal provided with means to supply the circulating medium to said chambers, of bearings in which said journals are rotatably mounted and means to feed a tube to be welded across said rolls.

In testimony whereof, we have signed our names to this specification.

FREDERICK S. STEARNS.
CHESTER W. GREENE.